United States Patent Office 3,411,655
Patented Nov. 19, 1968

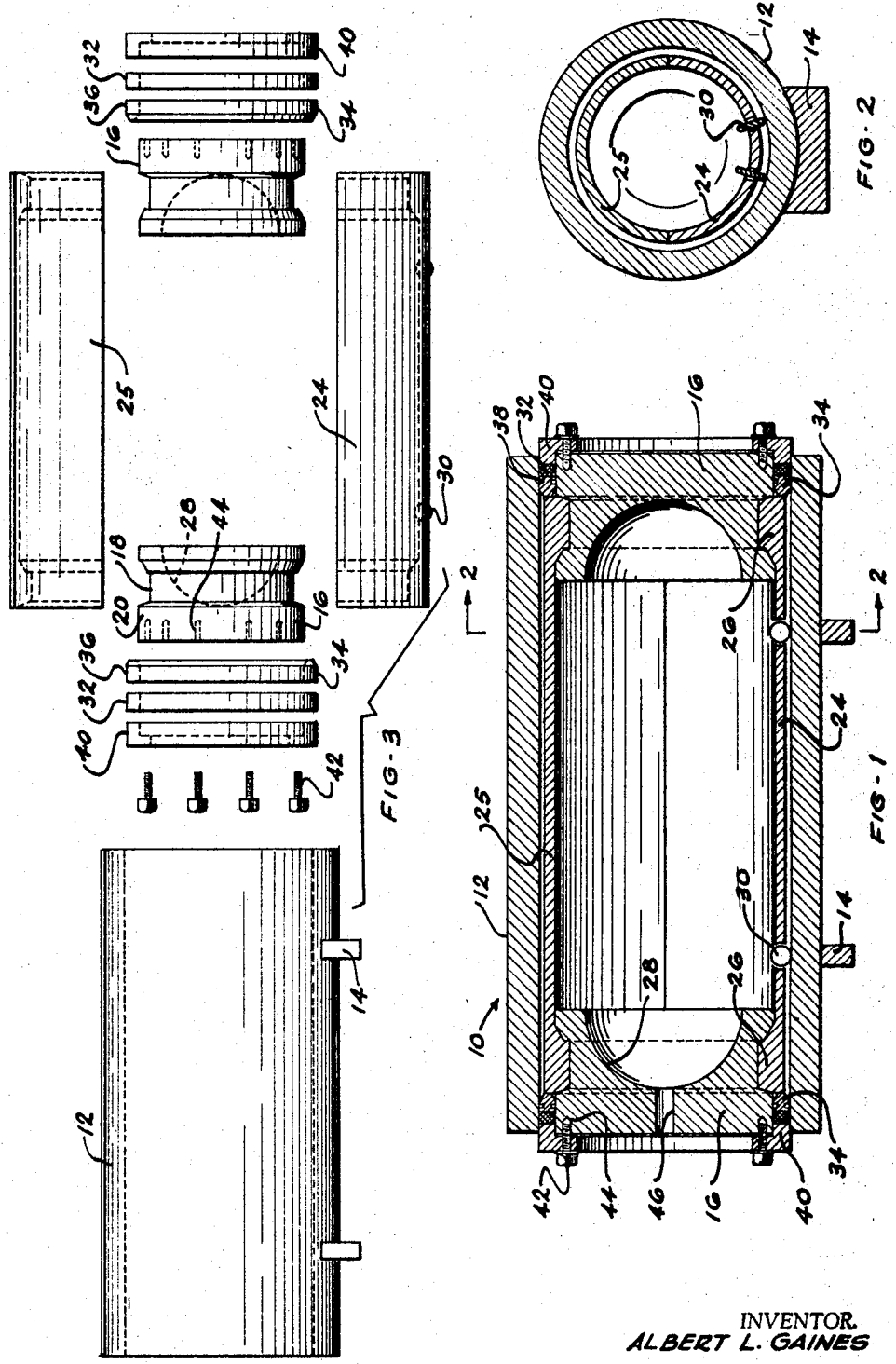

3,411,655
HIGH PRESSURE VESSEL HAVING HOOP LOADED OUTER CYLINDER AND AXIALLY LOADED SPLIT INNER CYLINDER
Albert L. Gaines, Simsbury, Conn., assignor to Combustion Engineering, Inc., Windsor, Conn., a corporation of Delaware
Filed Sept. 27, 1966, Ser. No. 582,347
13 Claims. (Cl. 220—3)

ABSTRACT OF THE DISCLOSURE

A rapidly disassemblable pressure vessel comprising an open ended cylinder and a subassembly consisting of a pair of end plugs for closing the ends of the cylinder and a plug tie in the form of a segmented hollow cylinder extending between and interconnecting the plugs. The subassembly is slidably insertable into the cylinder and incorporates radially expandable seals between the facing surfaces of the plugs and cylinder for sealing the ends of the vessel.

---

This invention relates to pressure vessels adapted to contain fluid under high pressure. More particularly, the invention relates to a novel pressure vessel construction providing means for obtaining convenient access to, and disassembly of, the vessel thereby rendering the arrangement especially conducive for use as a high pressure test chamber.

In the past it has been the practice to form high pressure vessels from hollow cylindrical forging or the like having their ends closed by means of closure heads. Because the force exerted on the heads by the high pressure fluid is great, substantial means must be employed to afix the heads to the ends of the cylinder. Such means are commonly in the form of a circumferential weld connecting the head to the cylinder end; or, in the alternative, a plurality of threaded fasteners passing through and connecting the flanged ends of each of the members. While such arrangements have proved adequate to contain fluids under pressure, much inconvenience has resulted in their use as high pressure test chambers where repeated access to the vessel interior is required. In such applications access to the vessel interior can be obtained only by breaking the welds connecting the heads to the cylinder or by removing all of the fasteners that provide the connection therebetween, each of which are both cumbersome and time consuming.

According to the present invention means are provided in the fabrication of a pressure vessel wherein no welds or threaded fastenings are required to connect the closure heads to the cylindrical body, thereby permitting easy access to the vessel interior. Said means comprises an axially elongated outer cylinder of a type resistant to hoop stress, plug means closing the ends of said cylinder, said plug means including at least a portion thereof loosely received within the ends of said cylinder, a longitudinally segmented rear cylinder extending between and connecting said plug means, and means forming a pressure seal concentrically disposed between said plug means and said outer cylinder.

For a better understanding of the invention, its operating advantages and the specific objects obtained by its use, reference should be made to the accompanying drawings and description which relate to a preferred embodiment of the invention.

FIGURE 1 is an elevational section of a preferred embodiment of the invention;

FIGURE 2 is a section taken along line 2—2 of FIGURE 1; and

FIGURE 3 is an exploded view of the components that comprise the apparatus shown in FIGURE 1.

Referring now to the drawings, the vessel 10 is constructed from an axially elongated outer cylinder 12 that may be fabricated from a hollow forging, or from bent plane, or the like, and requiring a thickness to render it capable of resisting only the hoop stress to which it will be subjected by the pressure of the fluid contained within the assembled vessel. Base mountings in the form of saddles 14 may be provided for mounting the outer cylinder 12 with its axis horizontal. In the alternative, the cylinder 12 can be mounted vertically through the use of appropriate mount supports. The ends of the outer cylinder 12 are closed by means of generally cylindrical closure plugs 16 of a size and thickness sufficient to render them resistant to the axial stress to which they will be subjected by the fluid pressure within the vessel. The outer diameter of the closure plugs 16 is such that they are concentrically spaced from the inner surface of the outer cylinder 12. The plugs 16 are also provided intermediate their ends with an annular recess or groove 18 forming a head portion 20 on one side and a foot portion 22 on the other side. The grooves 18 are adapted to engage tie means in the form of longitudinally split cylindrical segments 24 and 25 which are here shown as together forming an inner cylinder concentrically disposed within the outer cylinder 12. The segments extend between the opposed closure plugs 16 and are provided at their ends with inturned flanges 26 which conform generally to the shape of the recesses or grooves 18 and which are received therein in order to restrain the plugs against relative axial movement.

While the segments in the disclosed embodiment of the invention are two in number and form a complete inner cylinder when assembled, it should be understood that more than two segments can be employed and they need not form a complete cylinder when assembled. The criterion is that the segments together provide sufficient material thickness to withstand the tensile forces generated therein by the axial stresses imposed upon the plugs 16.

In order to render the engagement between the flanges 26 and the recesses 18 more positive the inner ends of the plugs 16 are provided with a hemispherical recess 28 which is effective, when fluid pressure is applied to the vessel, to bias the annular foot 22 on each of the plugs 16 radially outwardly into engagement with the underside of the flanges 26 on the cylindrical segments 24.

As shown in FIGURES 1 and 2, a slight clearance is provided between the outer cylinder 12 and the segments 24 and 25. This clearance need only be such as to permit relative axial movement between the cylinder 12 and segments 24 when access to the vessel interior is desired. Such axial movement can be enhanced by means of roller bearings 30 or the like, here shown as being attached to the lower cylindrical segment 24 within apertures provided therein for reception of the bearings. The bearings 30 may alternatively be mounted on the lower wall surface of the outer cylinder 12. Since there is a clearance between the outer cylinder 12 and the cylindrical segments, it is necessary that the inturned flanges 26 on the segments be sized so as to permit continued engagement within the closure head grooves 18 when fluid pressure is applied to the assembled vessel and the segments have a tendency to be urged radially outwardly against the surface of the outer cylinder 12. Therefore, the radial dimension of the inturned flanges 26 and the depth of grooves 18 which receive them must be greater than that of the clearance between the outer cylinder and the segments.

Each end of the vessel is sealed between the outer cylinder 12 and the closure plugs 16 by means of an annular sealing gasket 32 which is disposed in the space formed between the cylinder and the plug. The gasket 32 is disposed against an annular gasket support ring 34 which surrounds the plug head 20 in abutment with the end of the segments 24 and 25. The gasket support ring 32 may be provided with annular grooves 36 adapted to receive O-ring seals 38. Abutting the gasket 32 on the side opposite from the support ring 34 is an annular backing ring 40 having an inner end of a size to be received within the space formed between the outer cylinder 12 and the plug head 20. The outer end of the ring 40 is flanged to provide circumferentially spaced apertures adapted to receive threaded fasteners 42 engageable with threadedly bored holes 44 in the plug head 20 whereby torqing of the fasteners forces the inner end of the ring 40 against the gasket 32 compressing it against the support ring 34 and expanding its sides to establish a seal at the vessel ends. An opening 46 may be provided in one of the end plugs 16 to receive a fitting (not shown) for the supply of fluid to the vessel.

While the herein disclosed vessel arrangement may be effectively employed as a containment structure for high pressure fluids, it is particularly adapted for use as a chamber within which tests to be made under high pressure conditions can be conducted. Its operation in this sense is as follows. Assembly is begun by mounting the end plugs 16 and the lower cylindrical segment 24 with the flanges 26 thereof being inserted in the annular recesses or grooves 18. The equipment to be tested is placed on the lower segment 24 and the upper segment 25 then positioned with its flanges 26 engaging the grooves 18. Thereafter the plug-segment sub-assembly is axially inserted into the outer cylinder 12 until the plugs 16 are substantially flush with the ends of the outer cylinder. Next, the gasket support rings 34 are inserted into the space between the plug head 20 and the inner surface of the cylinder 12 until they abut the ends of the segments 24 and 25 which protrude from the outer surface of the plugs. The sealing gaskets 32 are then inserted into the space followed by the inner ends of the gasket backing rings 40 whose openings are aligned with the threaded bore holes 44 and fasteners 42 then applied. When torque is applied to the fasteners, the gaskets 32 are compressed against the support rings 36 and their sides expanded into sealing engagement between the opposed surfaces of the outer cylinder 12 and the closure plug head 20. After the seals are established fluid under pressure can be admitted to the vessel through the opening 46. When it is desired to obtain access to the vessel interior, the procedure is reversed. Fluid is first withdrawn from the vessel through a fitting provided in the opening 46 and the fasteners 42 are loosed to break the seal. After the seals have been broken, the entire sub-assembly, including the plugs 16, segments 24 and 25, seals 32 and rings 34 and 40 can be withdrawn together from the cylinder 12. Once the sub-assembly has been removed from the cylinder, the upper segment 25 can then be removed to expose the interior of the sub-assembly in order to expose the apparatus being tested therein which rests on the lower segment 24.

It will be evident that, because of the arrangement, the cylinder that forms the body of the vessel is subjected only to the hoop stresses generated by the pressure of the fluid therewithin. The axial stresses are relieved by the tie means formed by the cylindrical segments 24 and 25 connecting the opposed end plugs 16. While the segments will be induced to spread by the force of the fluid pressure, they are not themselves subjected to hoop loading since they do not themselves form a fluid containment structure. Therefore, each of the containment members can be designed to withstand only those stresses to which they are directly subjected. Since no welds or threaded connections are required in the structure, the vessel can be easily disassembled without the need of breaking the welds or threaded connections. The amount of effort required in loosening the fasteners 42 is relatively insignificant since all that need be accomplished thereby is the breaking of the seal of the gasket 32 and the opposed surfaces on the cylinder 12 and head 20 of the plugs 16 such that the sub-assembly can be physically removed from the cylinder.

It will be understood that various changes in the details, materials and arrangement of parts which have been herein described and illustrated in order to explain the nature of the invention, may be made by those skilled in the art within the principle and scope of the invention as expressed in the appended claims.

What is claimed is:

1. A high pressure vessel structure adapted for rapid disassembly comprising:
   (a) an axially elongated, open ended outer cylinder of a type resistant to hoop stress;
   (b) generally cylindrical closure plugs closing the ends of said cylinder, said closure plugs having an outer diameter to be received within the ends of said cylinder in concentrically spaced relation from the inner surface thereof;
   (c) means forming a radially expandable and contractable fluid seal concentrically disposed in each of the spaces formed between the outer surface of said closure plugs and the inner surface of said cylinder;
   (d) axial stress-resistant plug tie means extending between and interconnecting said closure plugs, said plug tie means including at least one generally arcuate body formed as a segment of a hollow cylinder received within said cylinder in spaced relation from the inner surface thereof, the ends of said body being concentrically disposed between said closure plugs and the inner surface of said outer cylinder and being formed with inturned flanges for engagement with said closure plugs;
   (e) and means forming an annular recess on the outer surface of said closure plugs intermediate the end surfaces thereof for receiving said flanges to restrain said closure plugs against relative axial movement.

2. Vessel structure as recited in claim 1 wherein said flanges are freely radially movable with respect to said recesses.

3. Vessel structure as recited in claim 1 including roller means operative between the surfaces of said tie means and said outer cylinder for assisting relative axial movement therebetween.

4. Vessel structure as recited in claim 1 including a generally spherical recess provided in the axially inner end of each of said closure plugs, said recess being of a size and extent to render the said end surface radially expandable when the vessel is pressurized.

5. Vessel structure as recited in claim 1 wherein said fluid seal means comprises:
   (a) an annular gasket support concentrically disposed between each of said closure plugs and said outer cylinder, said gasket supports being relatively axially outwardly movable with respect to the ends of said cylinder;
   (b) annular sealing gaskets concentrically disposed between said closure plugs and said outer cylinder in substantially abutting relation to said gasket supports; and
   (c) gasket backing means rigidly positioned at the ends of said outer cylinder for engaging said sealing gaskets on the side opposite from said gasket supports.

6. Vessel structure as recited in claim 5 wherein said gasket backing means comprises means attached to the outer end surfaces of said closure plugs and having an inner end adapted to abuttingly engage said gaskets.

7. Vessel structure as recited in claim 6 wherein said gasket backing means includes:
   (a) an annular ring concentrically disposed between each of said closure plugs and said outer cylinder for engaging said sealing gasket on the side opposite from said gasket support; and (b) means for imparting an axially inwardly directed force on said gasket backing means for preloading said sealing gasket.

8. Vessel structure as recited in claim 7 wherein said force imparting means comprises threaded connectors threadedly received in said closure plugs and engaging said gasket backing means for axially inward movement upon tightening said connectors.

9. Vessel structure as recited in claim 2 wherein said closure plug tie means includes a pair of arcuate bodies each encompassing substantially half of the interior of said outer cylinder.

10. Vessel structure as recited in claim 9 including:
   (a) means for mounting said outer cylinder on its horizontal axis; and
   (b) roller bearing means mounted on the lower of said inner cylinder segments for assisting relative axial movement between said inner and outer cylinders.

11. Vessel structure as recited in claim 7 wherein said fluid seal means at each end of said vessel comprise:
   (a) an annular gasket support ring concentrically disposed between said closure plug and said outer cylinder, said gasket support ring being relatively axially outwardly movable with respect to the end of said outer cylinder upon the application of sufficient pressure to said vessel;
   (b) an annular sealing gasket concentrically disposed between said closure plug and said outer cylinder adjacent said gasket support ring; and
   (c) gasket backing means rigidly positioned at the outer end of said outer cylinder and rigidly fixed in relation thereto for engaging said gasket on the side opposite said gasket support ring.

12. Vessel structure as recited in claim 11 including means for preloading said gasket.

13. Vessel structure as recited in claim 12 including:
   (a) a gasket compression ring mounted to said closure plug, said ring having axially inwardly directed flange means for engaging said sealing gasket on the side opposite from said gasket support ring; and
   (b) threaded connector means mounting said compression ring and adapted to impart an axially inwardly directed force on said compression ring for preloading said gasket.

References Cited

UNITED STATES PATENTS

| 2,027,606 | 2/1936 | Bredtschneider. |
| 2,203,364 | 6/1940 | Rathbun. |

FOREIGN PATENTS

| 117,303 | 7/1918 | Great Britain. |
| 659,287 | 10/1951 | Great Britain. |

RAPHAEL H. SCHWARTZ, *Primary Examiner.*